(12) United States Patent
Iglewski (10) Patent No.: US 11,047,336 B2
(45) Date of Patent: Jun. 29, 2021

(54) BELLMOUTH NOZZLE ASSEMBLY FOR A GAS TURBINE ENGINE

(71) Applicant: GENERAL ELECTRIC COMPANY, Schenectady, NY (US)

(72) Inventor: Tomasz Iglewski, Iglewski (PL)

(73) Assignee: GENERAL ELECTRIC COMPANY, Schenectady, NY (US)

(*) Notice: Subject to any disclaimer, the term of this patent is extended or adjusted under 35 U.S.C. 154(b) by 157 days.

(21) Appl. No.: 16/280,430

(22) Filed: Feb. 20, 2019

(65) Prior Publication Data
US 2020/0025140 A1 Jan. 23, 2020

(30) Foreign Application Priority Data
Feb. 21, 2018 (PL) .......................................... 424645

(51) Int. Cl.
| | | |
|---|---|---|
| F02K 1/09 | (2006.01) | |
| F02K 1/76 | (2006.01) | |
| F02K 1/64 | (2006.01) | |
| F02K 1/66 | (2006.01) | |

(52) U.S. Cl.
CPC ............... F02K 1/09 (2013.01); F02K 1/645 (2013.01); F02K 1/66 (2013.01); F02K 1/763 (2013.01)

(58) Field of Classification Search
CPC . F02K 1/66; F02K 1/645; F02K 1/763; F02K 1/09
See application file for complete search history.

(56) References Cited

U.S. PATENT DOCUMENTS

| | | | | |
|---|---|---|---|---|
| 3,303,653 | A | * | 2/1967 | Hull, Jr. ................. F02K 1/645 60/229 |
| 4,373,328 | A | | 2/1983 | Jones |
| 5,974,783 | A | | 11/1999 | Gonidec et al. |
| 6,751,944 | B2 | * | 6/2004 | Lair .......................... F02K 1/06 239/265.25 |
| 7,127,880 | B2 | | 10/2006 | Lair et al. |
| 8,276,364 | B2 | | 10/2012 | Levasseur |
| 8,959,889 | B2 | | 2/2015 | Howe |
| 9,062,626 | B2 | | 6/2015 | Marche |
| 9,074,531 | B2 | | 7/2015 | Grabowski et al. |
| 9,085,369 | B2 | | 7/2015 | Flin et al. |
| 9,297,333 | B2 | | 3/2016 | Filter |

(Continued)

FOREIGN PATENT DOCUMENTS

| | | |
|---|---|---|
| EP | 0561791 A1 | 9/1993 |
| EP | 0680557 A1 | 11/1995 |

(Continued)

OTHER PUBLICATIONS

Polish Search Report dated Jul. 20, 2018 which was issued in connection with Polish patent application No. P-424645 which was filed on Feb. 21, 2018.

*Primary Examiner* — Katheryn A Malatek
(74) *Attorney, Agent, or Firm* — Dority Manning, P.A.

(57) ABSTRACT

A gas turbine engine that includes a nozzle assembly that has features that facilitate airflow into and through a bypass passage of the gas turbine engine during a reverse thrust operation is provided. The nozzle assembly of the gas turbine engine also includes features that increase the effectiveness of the thrust reverse system of the gas turbine engine. Methods for reversing the thrust of a gas turbine engine are also provided.

20 Claims, 6 Drawing Sheets

(56) References Cited

U.S. PATENT DOCUMENTS

| | | | |
|---|---|---|---|
| 9,759,087 | B2 | 9/2017 | Amkraut et al. |
| 9,777,671 | B2 | 10/2017 | Ramlaui et al. |
| 2010/0139240 | A1* | 6/2010 | Levasseur ............. F02K 1/1207 60/204 |

FOREIGN PATENT DOCUMENTS

| | | |
|---|---|---|
| GB | 1479148 A | 7/1977 |
| WO | 2018009084 A1 | 1/2018 |

* cited by examiner

BELLMOUTH NOZZLE ASSEMBLY FOR A GAS TURBINE ENGINE

FIELD

The present subject matter relates generally to gas turbine engines, and more particularly to bellmouth nozzles for gas turbine engines.

BACKGROUND

Turbofan engines generally include a fan and a core arranged in flow communication with one another. During normal operation, a first portion of air flowing across the fan may bypass the core through a bypass passage (defined between the core and an outer nacelle or fan cowl) and a second portion of air flowing across the fan may be provided to the core. The core of the turbofan engine generally includes, in serial flow order, a compression section, a combustion section, a turbine section, and an exhaust section. In operation, the air provided to the core flows through the compression section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere. The first portion of air flowing through the bypass passage may provide additional forward thrust.

Some turbofan engines include a thrust reverse system, such as e.g., a variable pitch fan assembly. Variable pitch fan assemblies generally include a plurality of circumferentially spaced fan blades that are rotatable through a plurality of fan blade angles about respective pitch axes. By rotating or pitching the fan blades, the volume of air flowing through the bypass passage may be adjusted to generate a desired thrust. In some instances, it is desirable to generate a decelerating reverse thrust, e.g. to decelerate an aircraft. To generate a reverse thrust, the pitch of the fan blades is reversed such that the flow of air through the bypass passage is reversed.

During a reverse thrust operation, the flow ingested into the outlet of the bypass passage tends to separate from an inner surface of the outer nacelle. Moreover, the ingested flow tends to circulate in a turbulent flow within the bypass passage without contributing to the reverse thrust operation. Such flow separation and circulation within the bypass passage is caused at least in part because the incoming air is required to make a very sharp turn (e.g., a one hundred eighty degree (180°) turn) to flow into the outlet of the bypass passage. That is, a free air stream flowing generally forward to aft and radially outward of the engine must make a sharp turn to flow into the outlet of the bypass passage such that it may then flow aft to forward to generate a reverse thrust. The flow separation and circulation of the ingested air within the bypass passage decreases engine performance and causes fan operability issues. In the past, reverse thrust systems have been implemented to address such challenges, but such systems have been unsatisfactory, complex and expensive, have caused outer nacelle leakages and bypass passage pressure losses, required additional air sources, and/or have added significant weight to the engine.

Accordingly, a gas turbine engine and methods for providing reverse thrust that address one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines an outlet and an axial direction, a radial direction, and a circumferential direction. The gas turbine engine includes a core turbine engine and a nacelle disposed about the core turbine engine along the circumferential direction. The nacelle extends between a first end and a second end along the axial direction. Further, the gas turbine engine includes a nozzle assembly disposed at or proximate the second end of the nacelle. The nozzle assembly is movable between a stowed position and a deployed position. The nozzle assembly includes an outer panel coupled with the nacelle, the outer panel movable along the radial direction to move the nozzle assembly between the stowed position and the deployed position. In addition, the nozzle assembly includes an elastic member coupled with the outer panel and with the nacelle. When the nozzle assembly is in the deployed position, the elastic member is inflated with an airflow such that the elastic member forms a bellmouth at the outlet of the gas turbine engine.

In some embodiments, the nacelle is spaced from the core turbine engine along the radial direction so as to define a bypass passage therebetween, and wherein the outlet is a bypass passage outlet.

In some embodiments, the gas turbine engine includes a thrust reverser system, wherein the thrust reverser system is a variable pitch fan assembly.

In some embodiments, the nacelle comprises an outer surface and wherein the nacelle defines a recess along the outer surface, and wherein when the nozzle assembly is in the stowed position, the elastic member is disposed within the recess and the outer panel is aligned with or seated flush with the outer surface of the nacelle along the radial direction.

In some embodiments, the elastic member is an airtight, elastic band.

In some embodiments, the elastic member extends annularly about the nacelle along the circumferential direction.

In some embodiments, the outer panel is pivotally coupled with the nacelle.

In some embodiments, the outer panel comprises one or more pivot connection members and the nacelle comprises one or more pivot connection members, and wherein the outer panel is pivotally coupled with the nacelle by one or more linkages.

In some embodiments, the outer panel is pivotally coupled with the nacelle by a lever arm, the lever arm extending between a proximal end and a distal end, and wherein the proximal end of the lever arm is pivotally connected with the nacelle and the distal end is attached to an inner surface of the outer panel.

In some embodiments, the nozzle assembly further comprises a retraction assembly for stowing the elastic member when the nozzle assembly is moved to the stowed position.

In some embodiments, the nacelle comprises an outer surface and wherein the nacelle defines a recess along the outer surface, the recess being defined by a recessed wall and one or more sidewalls, and wherein the nozzle assembly further comprises a retraction assembly, the retraction assembly comprising a retractable line tethered to the elastic member and retractable within the nacelle through an opening in at least one of the recessed wall and the one or more sidewalls.

In some embodiments, the outer panel is translatable along the radial direction between the deployed position and the stowed position.

In another exemplary aspect of the present disclosure, a method for reversing a thrust of a turbofan engine defining a bypass passage is provided. The method includes reversing a direction of airflow through the bypass passage. The method also includes deploying a nozzle assembly such that an elastic member of the nozzle assembly forms a bellmouth at a bypass passage outlet of the bypass passage.

In some implementations, the turbofan engine comprises a variable pitch fan assembly comprised of a plurality of fan blades each rotatable through a plurality of fan blade angles about respective pitch axes, and wherein reversing the direction of airflow through the bypass passage comprises rotating the plurality of fan blades about their respective pitch axes.

In some implementations, deploying the nozzle assembly comprises moving an outer panel of the nozzle assembly radially outward from an outer surface of the nacelle, and wherein when the outer panel is moved radial outward from the outer surface of the nacelle, the elastic member is inflated with a free stream airflow to form the bellmouth.

In some implementations, when the nozzle assembly is deployed, the bypass passage outlet has a radial width extending between the elastic member and an outer casing of a core turbine engine of the turbofan engine, wherein the curvature of the bellmouth gradually increases the radial width of the bypass passage outlet.

In yet another exemplary aspect of the present disclosure, a turbofan engine defining an axial direction, a radial direction, and a circumferential direction is provided. The turbofan engine includes a core turbine engine and a nacelle disposed about the core turbine engine along the circumferential direction and spaced from the core turbine engine along the radial direction to define a bypass passage therebetween, the nacelle extending between a first end and a second end along the axial direction, the second end of the nacelle and the core turbine engine defining a bypass passage outlet when the nozzle assembly is in the stowed position. Further, the turbofan engine includes a nozzle assembly movable between a stowed position and a deployed position. The nozzle assembly includes an outer panel coupled with the nacelle, the outer panel movable along the radial direction to move the nozzle assembly between the stowed position and the deployed position. Further, the nozzle assembly includes an elastic member coupled with the outer panel and with the nacelle, wherein when the nozzle assembly is in the deployed position, the elastic member is inflated with an airflow such that the elastic member forms a bellmouth that at least partially defines the bypass passage outlet.

In some embodiments, the outer panel extends between a first end and a second end along the axial direction, the first end being positioned upstream of the second end, and wherein when the nozzle assembly is in the deployed position, the first end of the outer panel is positioned outward of the second end of the outer panel along the radial direction.

In some embodiments, the outer panel comprises an outer surface and an opposing inner surface, and wherein the nacelle defines a recess along the outer surface of the nacelle, the recess being defined by a recessed wall and one or more sidewalls, and wherein the elastic member is attached to the recessed wall of the nacelle and the inner surface of the outer panel.

In some embodiments, a distance is defined between the inner surface of the outer panel and the recessed wall of the nacelle when the nozzle assembly is in the deployed position, and wherein the length of the elastic member is at least two (2) times greater than the distance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a gas turbine engine that includes a nozzle assembly that has features that facilitate the flow of air into and through a bypass passage of the gas turbine engine during a reverse thrust operation. The nozzle assembly of the gas turbine engine also includes features that increase the effectiveness of the thrust reverse system of the gas turbine engine. Methods for reversing the thrust of a gas turbine engine are also provided.

Figure 1:
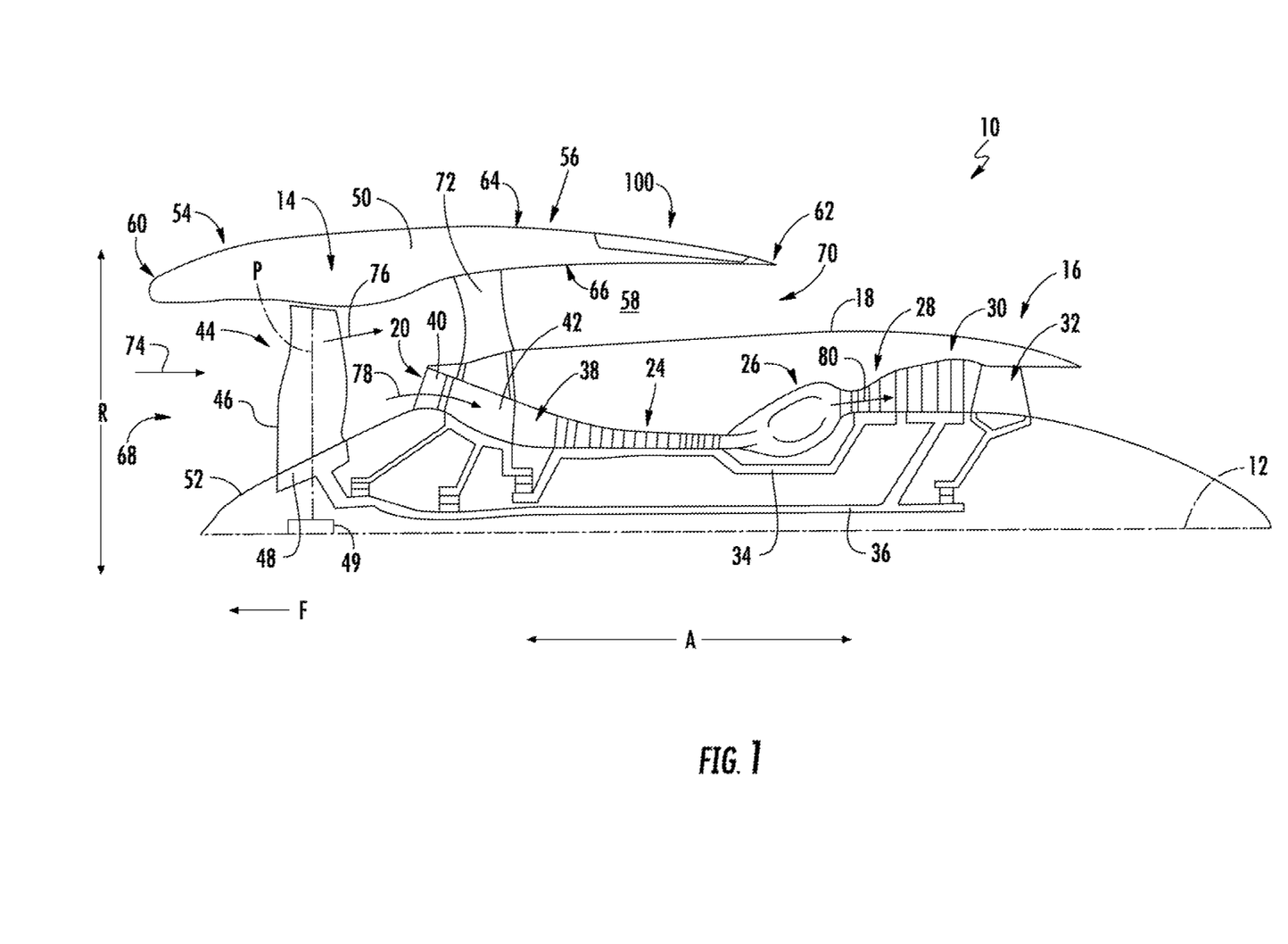
FIG. 1 provides a schematic cross-sectional view of an exemplary gas turbine engine depicting a bellmouth nozzle assembly in a stowed position according to various embodiments of the present subject matter.

FIG. 1 provides a schematic cross-sectional view of a gas turbine engine in accordance with an exemplary embodiment of the present disclosure. More particularly, for the embodiment of FIG. 1, the gas turbine engine is a turbofan jet engine 10, referred to herein as "turbofan engine 10." Although described with reference to an exemplary embodiment of the turbofan engine 10, in other exemplary aspects of the present disclosure, the turbofan engine 10 may have any other suitable configuration. For example, in other exemplary embodiments of the present disclosure, the turbofan engine 10 may include any other suitable number of compressors, turbines, and/or spools.

As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted in FIG. 1). In general, the turbofan engine 10 includes a fan section 14 and a core turbine engine 16 disposed downstream of the fan section 14.

The exemplary core turbine engine 16 depicted generally includes a substantially tubular outer casing 18 that defines an annular core inlet 20. The outer casing 18 encases, in serial flow relationship, a compressor section including a single compressor, which may be referred to as a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the fan section 14.

The compressor section, combustion section 26, turbine section, and jet exhaust nozzle section 32 together define a core air flowpath 38 through the core turbine engine 16. For the embodiment depicted, the core turbine engine 16 further includes a stage of inlet guide vanes 40 at a forward end of the core air flowpath 38, as well as a plurality of struts 42 extending through the core air flowpath 38 at a location forward of the HP compressor 24. The plurality of struts 42 may provide structural support for the core turbine engine 16.

For the embodiment depicted in FIG. 1, the fan section 14 includes a variable pitch fan 44 having a plurality of fan blades 46 coupled to a disk 48 in a spaced apart manner. As depicted, the fan blades 46 extend outwardly from disk 48 generally along the radial direction R. Each fan blade 46 is rotatable relative to the disk 48 through a plurality of fan blade angles about a pitch axis P. That is, the fan blades 46 of fan 44 are rotatable about their respective pitch axes P. The fan blades 46 are operatively coupled to an actuation member 49 that is configured to collectively vary the pitch of the fan blades 46 in unison. The disk 48 and the actuation member 49 are covered by rotatable front hub or spinner 52 aerodynamically contoured to promote an airflow through the plurality of fan blades 46. Additionally, the exemplary turbofan engine 10 depicted is configured as a direct drive turbofan engine. More specifically, the exemplary turbofan 10 depicted does not include a reduction gearbox, or power gearbox, between the LP shaft 36 and the fan section 14, and instead, the LP shaft 36 is directly mechanically connected to the fan 44 of the fan section 14. In some alternative embodiments, the fan blades 46, disk 48, and actuation member 49 are together rotatable about the longitudinal axis 12 by LP shaft 36 across a power gear box. The power gear box includes a plurality of gears for stepping down the rotational speed of the LP shaft 36 to a more efficient rotational fan speed.

As further shown in FIG. 1, the exemplary turbofan engine 10 includes an annular fan cowl or outer nacelle 50 that circumferentially surrounds the fan 44 and at least a portion of the core turbine engine 16. In particular, an upstream section 54 of the nacelle 50 extends about the fan 44 and a downstream section 56 of the nacelle 50 extends about the core turbine engine 16 so as to define a bypass airflow passage 58 therebetween. Further, for this embodiment, the nacelle 50 extends between a first end 60 and a second end 62 along the axial direction A and between an outer surface 64 and an inner surface 66 along the radial direction R. The first end 60 of the nacelle 50 and the spinner 52 define an inlet 68 to the turbofan engine 10. The second end 62 and the outer casing 18 of the core turbine engine 16 define a bypass passage outlet 70 of the bypass passage 58.

The nacelle 50 is mechanically coupled to the core turbine engine 16 by a stage of circumferentially-spaced and radially extending outlet guide vanes 72. For the embodiment depicted in FIG. 1, each outlet guide vane 72 in the stage of outlet guide vanes 72 extends between the core turbine engine 16 and the nacelle 50, and more specifically, each outlet guide vane 72 extends between the core turbine engine 16 and the nacelle 50 at a location downstream, or aft, of the core inlet 20 to the core air flowpath 38.

During operation of the turbofan engine 10, a volume of air 74 enters the turbofan 10 through the inlet 68 of the turbofan engine 10. As the volume of air 74 passes across the fan blades 46, a first portion of the air 74, as indicated by arrow 76, is directed or routed into the bypass airflow passage 58 and a second portion of the air 74, as indicated by arrow 78, is directed or routed into the core air flowpath 38, and more specifically, into the core inlet 20 defined by the core turbine engine 16 to the core air flowpath 38. The ratio between the first portion of air 76 through the bypass airflow passage 58 and the second portion of air 78 through the core inlet 20 of the core turbine engine 16 is commonly known as a bypass ratio.

Referring still to FIG. 1, the pressure of the second portion of air 78 is increased as it is routed through the HP compressor 24 and into the combustion section 26, where it is mixed with fuel and burned to provide combustion gases 80. The combustion gases 80 are routed through the HP turbine 28 where a portion of thermal and/or kinetic energy from the combustion gases 80 is extracted via sequential stages of HP turbine stator vanes that are coupled to the outer casing 18 and HP turbine rotor blades that are coupled to the HP shaft or spool 34 (not labeled), thus causing the HP shaft or spool 34 to rotate, thereby supporting operation of the HP compressor 24. The combustion gases 80 are then routed through the LP turbine 30 where a second portion of thermal and kinetic energy is extracted from the combustion gases 80 via sequential stages of LP turbine stator vanes that are coupled to the outer casing 18 and LP turbine rotor blades that are coupled to the LP shaft 36 or spool 36 (not labeled), thus causing the LP shaft 36 or spool 36 to rotate, thereby supporting operation of the fan 44.

The combustion gases 80 are subsequently routed through the jet exhaust nozzle section 32 of the core turbine engine 16 to provide propulsive thrust. Simultaneously, a pressure of the first portion of air 76 is substantially increased as the first portion of air 76 is routed through the bypass airflow passage 58 before it is exhausted from the fan nozzle outlet 70 of the turbofan engine 10, also providing propulsive forward thrust.

The exemplary turbofan engine 10 of FIG. 1 includes a thrust reverser system to generate a decelerating reverse thrust, e.g. to decelerate an aircraft (not shown) to which the turbofan engine 10 is coupled. For this embodiment, the thrust reverser system of the turbofan engine 10 is the variable pitch fan assembly 44. To generate a reverse thrust, the pitch of each of the fan blades 46 is reversed to a negative angle such that the flow of air through the bypass passage 58 is reversed. That is, the actuation member 49 drives the fan blades 46 to a reverse pitch angle such that air flows from the outlet 70 of the bypass passage 58 in a forward direction F to the inlet 68 of the turbofan engine 10. By reversing the direction of the air flowing through the bypass passage 58, reverse thrust is generated. In accordance with exemplary aspects of the present disclosure, the turbofan engine 10 of FIG. 1 includes an elastic bellmouth nozzle assembly 100 that includes features that facilitate a flow of air into and through the bypass passage 58 during a reverse thrust operation and also includes features that increase the effectiveness of the thrust reverser system, which in this embodiment is the variable pitch fan 44. The nozzle assembly 100 will be explained in greater detail below.

Figure 2:
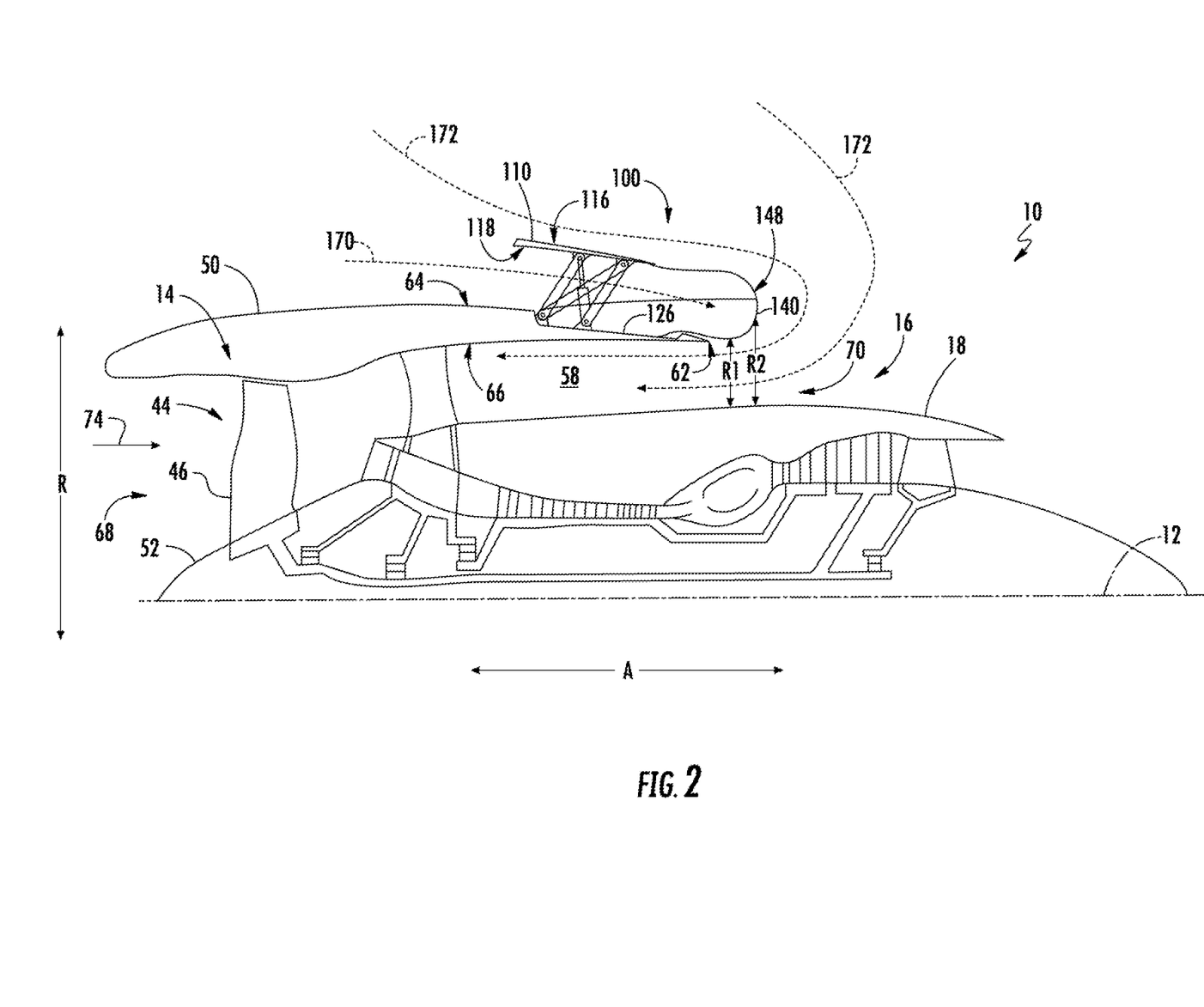
FIG. 2 provides a schematic cross-sectional view of the gas turbine engine of FIG. 1 depicting the bellmouth nozzle in a deployed position.
Figure 3:
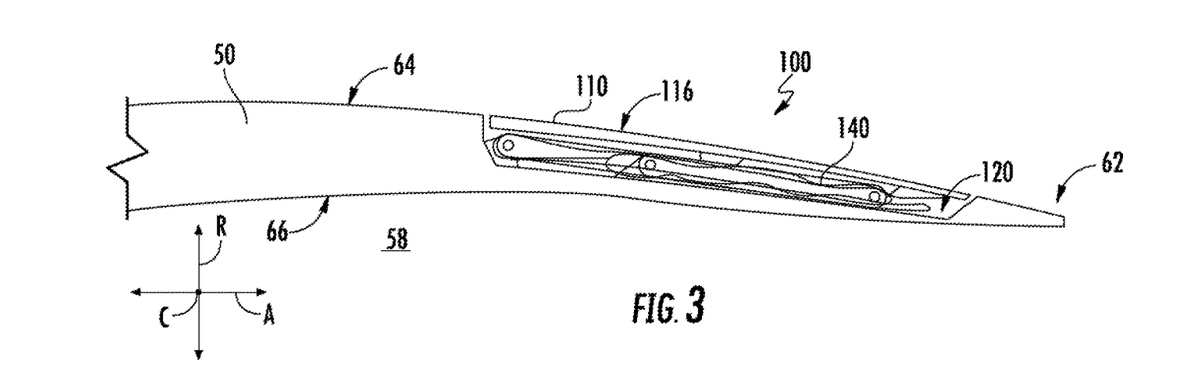
FIG. 3 provides a close up view of the nozzle assembly in the stowed position.
Figure 4:
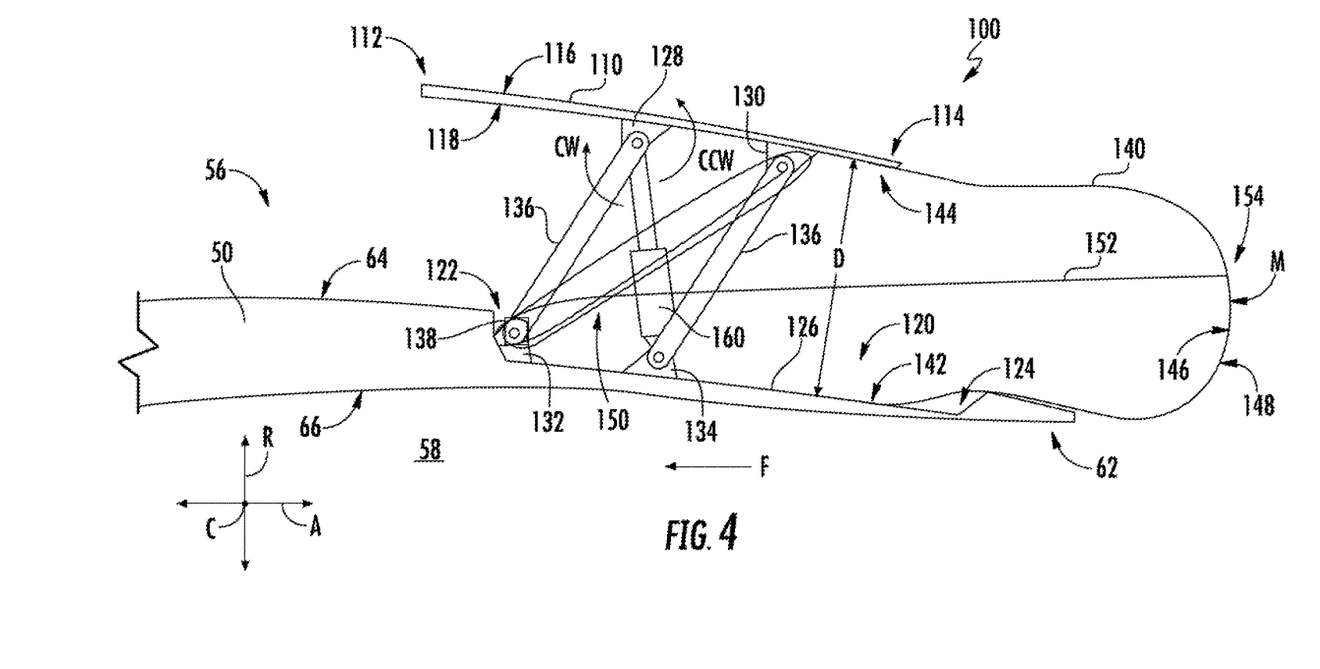
FIG. 4 provides a close up view of the nozzle assembly in the deployed position.

With reference now to FIGS. 1 through 4, FIG. 1 depicts the nozzle assembly 100 in a stowed position and FIG. 2 depicts the nozzle assembly 100 in a deployed position. FIG. 3 provides a close up view of the nozzle assembly 100 in the stowed position and FIG. 4 provides a close up view of the nozzle assembly 100 in the deployed position. As depicted, the nozzle assembly 100 is movable between the stowed position and the deployed position. During normal or forward thrust operation, the nozzle assembly 100 may be moved to or stored in the stowed position as shown in FIGS. 1 and 3. The nozzle assembly 100 may be moved to the deployed position as needed as shown in FIGS. 2 and 4, e.g., during a reverse thrust operation of the turbofan engine 10.

Figure 5:
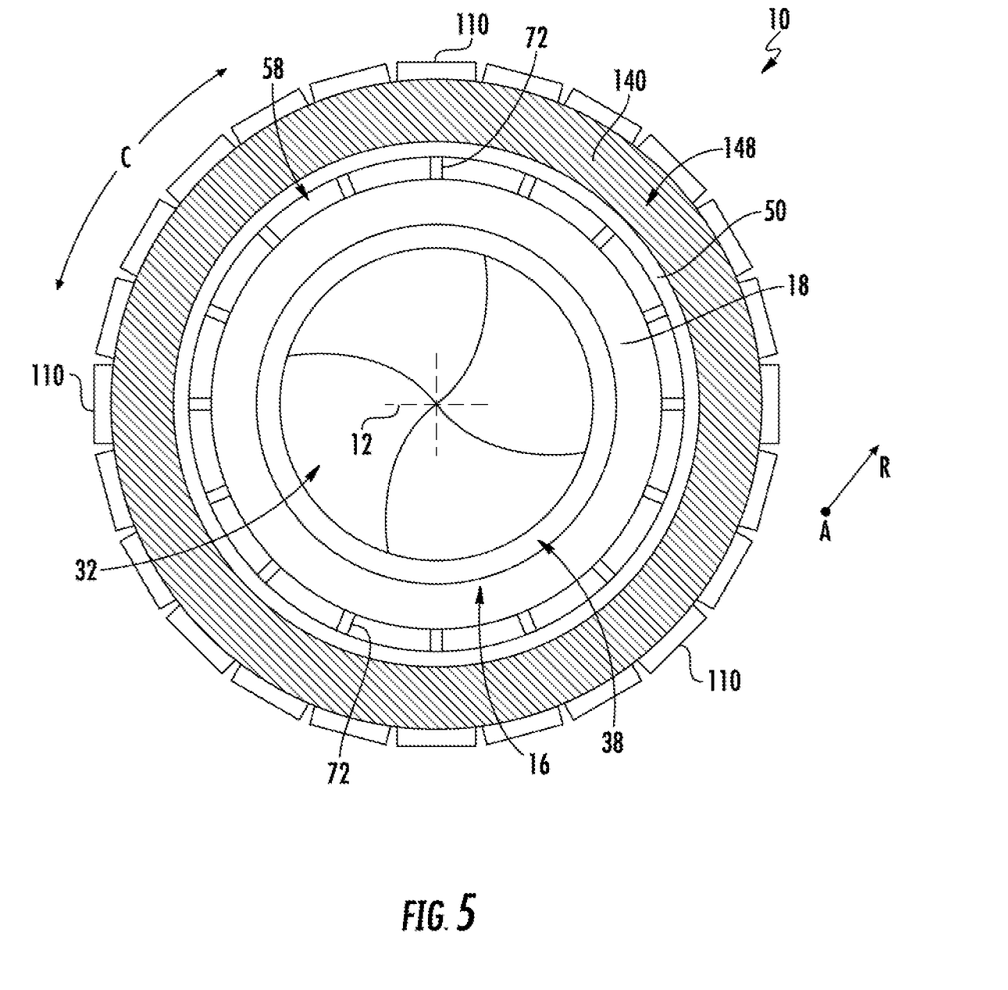
FIG. 5 provides a schematic aft-looking-forward view of the gas turbine engine of FIGS. 1 and 2 with the nozzle assembly shown in the deployed position.

As shown, the nozzle assembly 100 includes an outer panel 110. The outer panel 110 is movable along the radial direction R. More specifically, the outer panel 110 may be moved outward along the radial direction R to move the nozzle assembly 100 to the deployed position as shown in FIGS. 2 and 4 and the outer panel 110 may be moved inward along the radial direction R to move the nozzle assembly 100 to the stowed position as shown in FIGS. 1 and 3. As shown particularly in FIG. 4, the outer panel 110 extends between a first end 112 and a second end 114 along the axial direction A and between an outer surface 116 and an inner surface 118 along the radial direction R. The outer panel 110 also has a width extending along the circumferential direction C, e.g., as shown in FIG. 5.

For this embodiment, as depicted in FIG. 4, the nacelle 50 defines a recess 120. More particularly, the recess 120 is defined by the nacelle 50 along the outer surface 64 of the downstream section 56 of the nacelle 50. For the depicted embodiment, the recess 120 extends between a first recess end 122 and a second recess end 124 along the axial direction A. The second recess end 124 is positioned at or proximate the second end 62 of the nacelle 50. The recess 120 has a depth that is defined at least in part by a recessed wall 126. Further, for this embodiment, the recess 120 extends annularly about the nacelle 50 along the circumferential direction C.

As shown in FIG. 3, the outer panel 110 may be received within the recess 120 when the nozzle assembly 100 is in the stowed position. For this exemplary embodiment, when the nozzle assembly 100 is in the stowed position, the outer surface 116 of the outer panel 110 is aligned with or configured to sit flush with the outer surface 64 of the nacelle 50 along the radial direction R. Accordingly, when the nozzle assembly 100 is in the stowed position during normal operation of the turbofan engine 10 (FIGS. 1 and 3), there is minimal, if any, performance or operability impact. Further, as depicted in FIG. 3, the outer surface 116 of the outer panel 110 is contoured complementary to the outer surface 64 of the nacelle 50. In particular, for this embodiment, the outer surface 116 of the outer panel 110 has curvature that is complementary to the outer surface 64 of the nacelle 50. In this way, when the nozzle assembly 100 is in the stowed position, the outer panel 110 forms a continuous or substantially continuous aerodynamic outer wall of the turbofan engine 10.

With reference again particularly to FIG. 4, as shown, the outer panel 110 is coupled with the nacelle 50. In particular, for this embodiment, the outer panel 110 is pivotally coupled with the nacelle 50. The pivotal coupling of the outer panel 110 with the nacelle 50 allows the outer panel 110 to move along the radial direction R, which ultimately allows the nozzle assembly 100 to be moved between the stowed and deployed positions. As depicted, the outer panel 110 includes one or more first pivot connection members 128 and one or more second pivot connection members 130 extending from the inner surface 118 of the outer panel 110. The pivot connection members 128, 130 may be an assembly of pins and hinges, for example. The one or more first pivot connection members 128 are spaced from the second pivot connection members 130 along the axial direction A. In some embodiments, the nozzle assembly 100 includes a plurality of first pivot connection members 128 that are spaced from one another along the circumferential direction C and a plurality of second pivot connection members 130 that are spaced from one another along the circumferential direction C.

As further shown in FIG. 4, the nacelle 50 includes one or more first pivot connection members 132 and one or more second pivot connection members 134 extending from the recessed wall 126. The pivot connection members 132, 134 may be an assembly of pins and hinges, for example. The one or more first pivot connection members 132 are spaced from the second pivot connection members 134 along the axial direction A. In some embodiments, the nozzle assembly 100 includes a plurality of first pivot connection members 132 that are spaced from one another along the circumferential direction C and a plurality of second pivot connection members 134 that are spaced from one another along the circumferential direction C. The first and second pivot connection members 132, 134 of the nacelle 50 may be aligned with the first and second pivot connection members 128, 130 of the outer panel 110 along the circumferential direction C or may be offset from one another.

Linkages 136 extend between and couple respective pivot connection members of the nacelle 50 and pivot connection members of the outer panel 110 as shown in FIG. 4. In particular, as shown, one linkage 136 extends between and couples the first pivot connection member 128 of the outer panel 110 with the first pivot connection member 132 of the nacelle 50. Another linkage 136 extends between and couples the second pivot connection member 130 of the outer panel 110 with the second pivot connection member 134 of the nacelle 50. As will be appreciated, other linkages may extend between and couple respective pivot connection members of the outer panel and nacelle.

The coupling of the pivot connection members with the linkages pivotally couples the outer panel 110 with the nacelle 50. As noted above, the pivotal coupling allows the outer panel 110 to move along the radial direction R. In particular, from the perspective of FIG. 4, to move the nozzle assembly 100 from the stowed position to the deployed position, the linkages 136 are pivoted or rotated about the circumferential direction C in a counter clockwise direction CCW. To move the nozzle assembly 100 from the deployed position to the stowed position, the linkages 136 are pivoted or rotated about the circumferential direction C in a clockwise direction CW (from the perspective of FIG. 4).

Further, in some exemplary embodiments, one or more of the pivot connection members 128, 130, 132, 134 include a pivot stop 138. The one or more pivot stops 138 are configured to prevent the nozzle assembly 100 from over rotating or pivoting about the circumferential direction C, and more particularly for the depicted embodiment, the pivot stops 138 prevent the nozzle assembly 100 from pivoting or rotating in the counter clockwise direction CCW past a predetermined angular position. In this way, the linkages 136 are prevented from damaging the nacelle 50. Additionally, the pivot stops 138 may secure the outer panel 110 in a predetermined orientation. For instance, as depicted in FIG. 4, the pivot stops 138 have secured the outer panel 110 in a position such that the first end 112 of the outer panel 110 is positioned radially outward of the second end 114 of the outer panel 110. In this particular orientation, as will be explained more fully below, the outer panel 110 may facilitate or funnel an incoming free stream of air into an elastic member of the nozzle assembly 100.

As further depicted in FIG. 4, the nozzle assembly 100 includes an elastic member 140. For this embodiment, the elastic member 140 is an airtight elastic band that may be inflated as shown in FIG. 4 or stowed within the recess 120 as shown in FIG. 3. The elastic member 140 may be formed of any suitable elastic material. Further, as depicted, the elastic member 140 extends between a proximal end 142 and a distal end 144 and has a leading side 146 and a trailing side 148 opposite the leading side 146. A midpoint M is defined midway between the proximal end 142 and the distal end 144.

The elastic member 140 is coupled with the outer panel 110 and the nacelle 50. In particular, the distal end 144 of the elastic member 140 is attached to the inner surface 118 of the outer panel 110 at or proximate the second end 114 of the outer panel 110 and the proximal end 142 of the elastic member 140 is attached to the recessed wall 126 of the nacelle 50 at or proximate the second recess end 124. By attaching the elastic member 140 as shown in FIG. 4 to the outer panel 110 and the recessed wall 126, when the nozzle assembly 100 is moved to the stowed position (FIGS. 1 and 3), the elastic member 140 may be completely stowed within the recess 120 as shown in FIGS. 1 and 3. Thus, the elastic member 140 does not affect performance or operability of the turbofan engine 10 during normal, forward thrust operation.

In addition, as shown in FIG. 4, a distance D is defined between the inner surface 118 of the outer panel 110 and the recessed wall 126 of the nacelle 50 when the nozzle assembly 100 is in the deployed position. In this exemplary embodiment, the length of the elastic member 140 is at least three times greater than the distance D. The length of the elastic member 140 being measured from the proximal end 142 to the distal end 144 along a line extending along the surface of the elastic member 140 from the proximal end 142 to the distal end 144. In this way, when the elastic member 140 is inflated, the elastic member 140 extends downstream of the second end 62 of the nacelle 50. Consequently, the trailing side 148 of the elastic member 140 may act as an extension of the inner surface 66 of the nacelle 50 and may form a bellmouth at the outlet 70 of the bypass passage 58. As will be explained in greater detail herein, the bellmouth shape of the elastic member 140 in the deployed position advantageously provides more efficient, uniform airflow into the outlet 70. In yet other embodiments, the length of the elastic member 140 is at least two times greater than the distance D.

FIG. 5 provides a schematic aft-looking-forward view of the turbofan engine 10 of FIGS. 1 and 2 with the nozzle assembly 100 shown in the deployed position. As shown, for this exemplary embodiment, the elastic member 140 extends annularly about the nacelle 50 along the circumferential direction C and includes a plurality of outer panels 110 coupled with the annular elastic member 140. As the elastic member 140 is disposed annularly about the nacelle 50 along the circumferential direction C, the nozzle assembly 100 may facilitate uniform flow into the outlet 70 of the bypass passage 58 annularly about the turbofan engine 10 and may also provide an annular air brake. Further, as the elastic member 140 is annular, there are no leakages through the elastic member 140. This may provide for a more efficient air brake and may provide a more efficient and uniform flow into the outlet 70 of the bypass passage 58. In alternative exemplary embodiments, the nozzle assembly 100 includes a plurality of elastic members 140 spaced along the circumferential direction C that may be coupled with one or more outer panels 110.

Returning again to FIG. 4, as shown, the nozzle assembly 100 includes a retraction assembly 150 that is operatively configured to facilitate proper stowing of the elastic member 140 within the recess 120. For this exemplary embodiment, the retraction assembly 150 is a pulley system. The pulley system includes a pulley line 152 that is tethered to the elastic member 140 at an attachment point 154 proximate the midpoint M of the elastic member 140. Additionally, the pulley line 152 is tethered to the first pivot connection member 132 of the nacelle 50 that doubles as a pulley or pulley block and the second pivot connection member 130 of the outer panel 110 that doubles as a pulley as well. When the nozzle assembly 100 is moved from the deployed position to the stowed position, the linkages 136 are rotated about the circumferential direction C in a clockwise direction CW (from the perspective of FIG. 4). As this occurs, the distance between the first pivot connection member 132 of the nacelle 50 and the second pivot connection member 130 of the outer panel 110 increases, causing the tension in the pulley line 152 to increase. The increased tension in the pulley line 152 causes the pulley line 152 to pull the portion of the elastic member 140 proximate the midpoint M forward (generally in the direction of arrow F of FIG. 4) along the axial direction A. As outer panel 110 is moved inward along the radial direction R and the elastic member 140 is pulled forward, the elastic member 140 is pulled forward such that the elastic member 140 is received within the recess 120 as shown in FIG. 3. Although only a single retraction assembly 150 is shown in FIG. 4, the nozzle assembly 100 may include a plurality of retraction assemblies positioned about the circumferential direction C. Further, in alternative exemplary embodiments, the retraction assembly may include a retractable line that is tethered to the elastic member 140 in the same manner as described above but that is retractable into an opening within nacelle 50 instead of the being tethered to the pivot connection members 132, 130.

As further depicted in FIG. 4, the nozzle assembly 100 includes an actuator 160. The actuator 160 is operatively configured to move or facilitate the movement of the nozzle assembly 100 between the deployed and stowed positions. The actuator 160 may be an electrical actuator, a mechanical actuator, another suitable type of actuator, or a combination thereof. In this embodiment, the actuator 160 is a linear electromechanical actuator. As shown in FIG. 4, the actuator 160 is operatively coupled with the first pivot connection member 128 of the outer panel 110 and the second pivot connection member 134 of the nacelle 50. To move the nozzle assembly 100 from the deployed position to the stowed position, the stroke of the rod of the actuator 160 is decreased, which drives the first pivot connection member 128 and consequently the outer panel 110 toward the nacelle 50. Preferably, the nozzle assembly 100 is moved from the deployed position to the stowed position when the aerodynamic forces acting on the nozzle assembly 100 are minimal, such as e.g., when the turbofan engine 10 is at rest.

During a reverse thrust operation, the nozzle assembly 100 may be selectively moved to the deployed position. The nozzle assembly 100 may be moved to the deployed position in the following exemplary manner with particular reference to FIG. 2. A latching mechanism (not shown) may be released such that the outer panel 110 is moved outward along the radial direction R by aerodynamic forces. As the outer panel 110 is deployed, the forward motion of the turbofan engine 10 causes free stream air or a free stream airflow, denoted as 170, to flow between the inner surface 118 of the outer panel 110 and the nacelle 50. The air 170 flowing between the outer panel 110 and the nacelle 50 is compressed. The compressed air inflates the elastic member 140. The inflated elastic member 140 forms a bellmouth at the outlet 70 of the bypass passage 58. In particular, the elastic member 140 inflated in a bellmouth shape acts as a continuation of the inner surface 66 of the nacelle 50 and gradually increases the radial width of the outlet 70 between the trailing side 148 of the elastic member 140 and the outer casing 18 of the core turbine engine 16. Thus, when the nozzle assembly 100 is in the deployed position and the elastic member 140 is inflated, the bellmouth at least partially defines the bypass passage outlet 70.

The bellmouth curvature of the elastic member 140 advantageously provides an efficient guide for a free stream of air, denoted by 172, to flow into the outlet 70 of the bypass passage 58. In particular, the bellmouth curvature reduces the pressure of the free stream air 172 flowing into the outlet 70 (e.g., compared to a free stream airflow 172 required to make a sharp turn about the second end 62 of the nacelle 50 to enter the outlet 70). Further, the bellmouth curvature facilitates a uniform flow into the outlet 70 of the bypass passage 58. Accordingly, the air moving through the bypass passage 58 along the inner surface 66 of the nacelle 50 has a more streamlined flow and has minimal, if any, circulation within the bypass passage 58. As yet another advantage, when the free stream airflow 170 dynamically inflates or expands the elastic member 140 into the bellmouth shape, the elastic member 140 acts as an airbrake, which may increase the effectiveness of the thrust reverse system of the turbofan engine 10, which in this embodiment is the variable pitch fan assembly 44.

After the aircraft or vehicle to which turbofan engine 10 is coupled has decelerated, the nozzle assembly 100 may be moved or returned to the stowed position. For this embodiment, the actuator 160 drives the first pivot connection member 128 toward the nacelle 50, causing the linkages 136 to pivot about their respective pivot connection members such that the outer panel 110 is moved in a clockwise direction CW. At the same time, the retraction assembly 150 retracts the elastic member 140 into the recess 120. As shown in FIG. 3, the linkages 136, pivot connection members 128, 130, 132, 134, actuator 160, retraction assembly 150, and elastic member 140 are all received within the recess 120 and the outer surface 116 of the outer panel 110 is aligned with the outer surface 64 of the nacelle 50 along the radial direction R.

Figure 6:
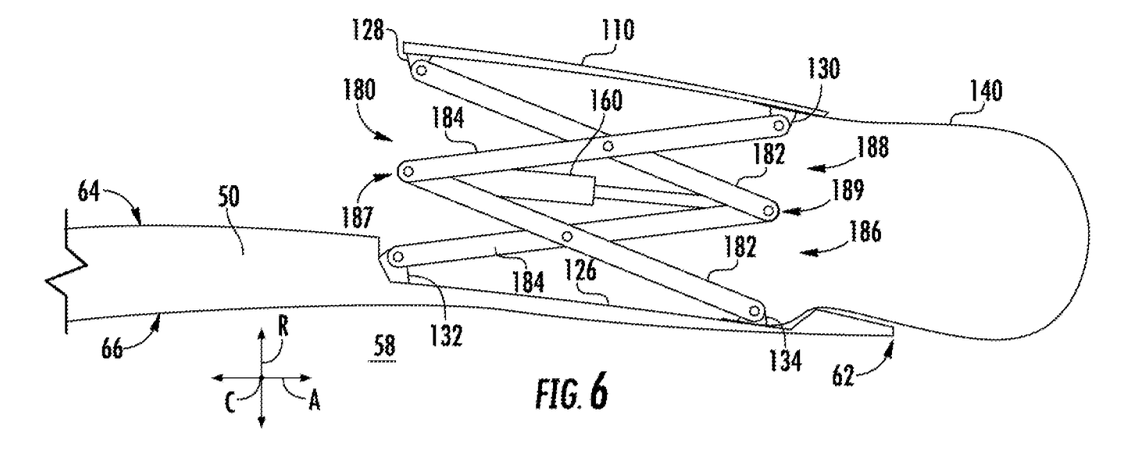
FIG. 6 provides a close up view of another exemplary nozzle assembly depicted in a deployed position in accordance with an exemplary embodiment of the present subject matter.

FIG. 6 provides a close up view of another exemplary nozzle assembly depicted in a deployed position. The exemplary nozzle assembly 100 of FIG. 6 is configured in a similar manner as the nozzle assembly of FIGS. 1 through 4, and accordingly, the same or similar reference numerals refer to the same or similar parts. In contrast with the nozzle assembly of FIGS. 1 through 4, the nozzle assembly 100 of FIG. 6 includes a scissor lift configuration for coupling the outer panel 110 with the nacelle 50. For this embodiment, the outer panel 110 is translatable along the radial direction R by scissor lift 180 so that nozzle assembly 100 may be moved between the deployed and stowed positions. Although not shown, the nozzle assembly 100 of FIG. 6 may include retraction assembly 150 for retracting the elastic member 140 when nozzle assembly 100 is moved from the deployed position to the stowed position.

As shown in FIG. 6, scissor lift 180 includes one or more pairs of lever arms 182, 184 that are pivotally connected by connecting pins (not labeled). Pairs of lever arms 182, 184 may be pivotally connected to one another via pins as well. A first pair 186 of lever arms 182, 184 is pivotally connected to first and second pivot connection members 132, 134 of nacelle 50. That is, lever arm 184 of the first pair 186 is pivotally connected to first pivot connection member 132 and lever arm 182 of the first pair 186 is pivotally connected to the second pivot connection member 134. A second pair 188 of lever arms 182, 184 is pivotally connected to first and second pivot connection members 128, 130 of outer panel 110. That is, lever arm 182 of the second pair 188 is pivotally connected to first pivot connection member 128 and lever arm 184 of the second pair 188 is pivotally connected to the second pivot connection member 130. The first and second pairs 186, 188 of lever arms are pivotally connected as well. As shown, the lever arm 182 of the first pair 186 is pivotally connected with the lever arm 184 of the second pair 188 at pivot connection 187 and the lever arm 184 of the first pair 186 is pivotally connected with the lever arm 182 of the second pair 188 at pivot connection 189. Actuator 160 operatively couples the scissor lift 180 at the pivot connections 187, 189 and may change the relative distance between the pivot connections 187, 189 to move outer panel 110 outward to the deployed position or inward to the stowed position along the radial direction R. By coupling the outer panel 110 with the nacelle 50 via the scissor lift 180, the outer panel 110 need not be pivoted into position; rather the outer panel 110 may be translated along the radial direction R, which may provide a less complex deployment of the outer panel 110. Further, the scissor lift 180 may provide for a structurally solid base for translating the outer panel 110 along the radial direction R as well as securing the outer panel 110 in place while deployed.

Figure 7:
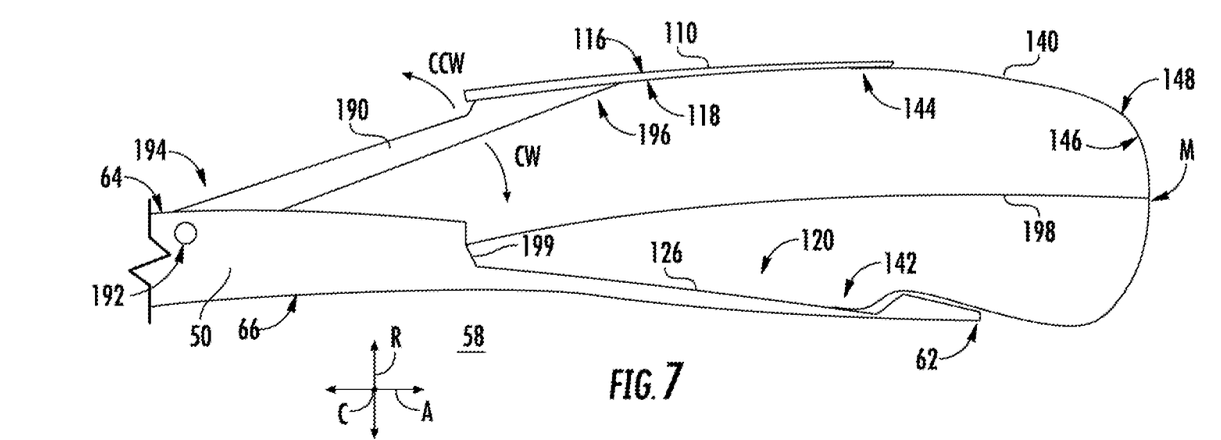
FIG. 7 provides a close up view of another exemplary nozzle assembly depicted in a deployed position in accordance with an exemplary embodiment of the present subject matter.

FIG. 7 provides a close up view of another exemplary nozzle assembly depicted in a deployed position. The exemplary nozzle assembly 100 of FIG. 7 is configured in a similar manner as the nozzle assembly of FIGS. 1 through 4, and accordingly, the same or similar reference numerals refer to the same or similar parts. In contrast with the nozzle assembly of FIGS. 1 through 4, the nozzle assembly 100 of FIG. 7 includes a lever arm configuration for coupling the outer panel 110 with the nacelle 50.

As shown in FIG. 7, for this embodiment, the outer panel 110 is pivotally coupled with the nacelle 50 via a lever arm 190. In particular, a proximal end 194 of lever arm 190 is pivotally connected with the nacelle 50 by pivot connection assembly 192, which may be a pin and clevis assembly, for example. A distal end 196 of the lever arm 190 is attached to the inner surface 118 of the outer panel 110. To move the outer panel 110 along the radial direction R, the lever arm 190 is driven about the circumferential direction C. In particular, to move the nozzle assembly 100 to the deployed position as shown in FIG. 7, the lever arm 190 is driven in a counterclockwise direction CCW along the circumferential direction C (from the perspective of FIG. 7). To move the nozzle assembly 100 to the stowed position as shown, the lever arm 190 is driven in a clockwise direction CW along the circumferential direction C (from the perspective of FIG. 7).

Further, for this embodiment, the retraction assembly 150 includes a retractable line 198 that is tethered to the leading side 146 of the elastic member 140 and retractable into an opening of sidewall 199 of the nacelle 50. When the nozzle assembly 100 is moved from the deployed position to the stowed position, a retraction mechanism (not shown) located within nacelle 50 may be activated to retract the retractable line 198 into the opening of the nacelle 50 through sidewall 199. Alternatively, the retractable line 198 may be retracted into an opening of the nacelle 50 through recessed wall 126. When the nozzle assembly 100 is moved from the stowed position to the deployed position, the retraction mechanism may be activated to release the retractable line 198 so that the elastic member 140 may be inflated with the free stream airflow 170 (FIG. 2). In some embodiments, the aerodynamic forces acting on the elastic member 140 when deployed may release the retractable line 198.

Figure 8:
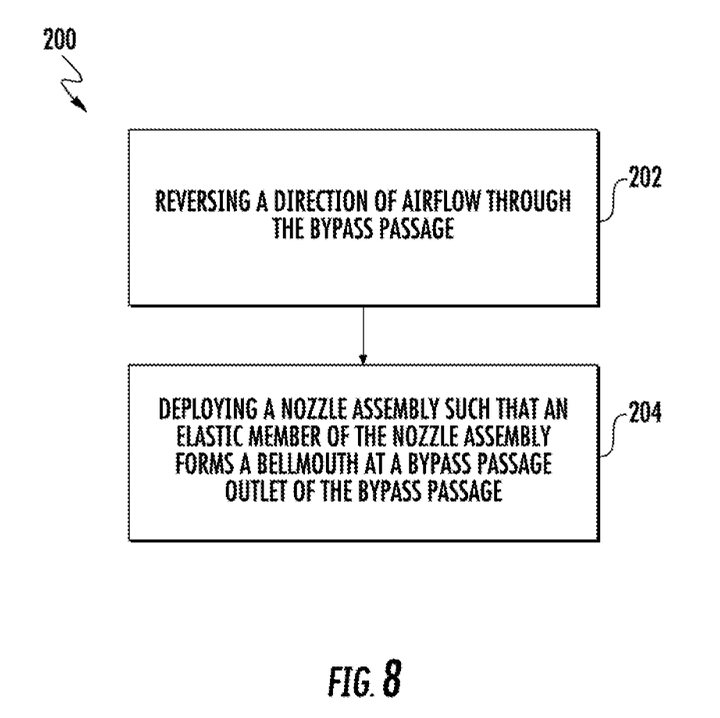
FIG. 8 provides a flow diagram of an exemplary method for reversing the thrust of a gas turbine engine.

FIG. 8 provides a flow diagram of a method (200) for reversing a thrust of a turbofan engine defining a bypass passage. For instance, the method (200) may be utilized in certain exemplary aspects with the exemplary turbofan engine 10 described above.

At (202), the method (200) includes reversing a direction of airflow through the bypass passage. For instance, a thrust reversing system of the turbofan engine may reverse the direction of airflow through the bypass passage. As one example, the turbofan engine includes a variable pitch fan assembly that includes a plurality of fan blades each rotatable through a plurality of fan blade angles about respective pitch axes. To reverse the direction of airflow through the bypass passage, the plurality of fan blades are rotated or pitched about their respective pitch axes, e.g., to a negative pitch. In this way, the fan blades create a lower pressure region that pulls air into a bypass passage outlet of the bypass passage.

At (204), the method (200) includes deploying a nozzle assembly such that an elastic member of the nozzle assembly forms a bellmouth at a bypass passage outlet of the bypass passage. As one example, as shown in FIG. 2, to deploy the nozzle assembly 100, the outer panel 110 is moved outward along the radial direction R relative to the outer surface 64 of the nacelle 50. When the outer panel 110 is moved radially outward, the elastic member 140, which is attached to the outer panel 110 and to the recessed wall 126 of the nacelle 50, is inflated with the free stream airflow 170 to form the bellmouth. Notably, the length of the elastic member 140 is such that the elastic member 140 forms the bellmouth at the bypass passage outlet 70. As noted above, the curvature of the bellmouth at the outlet 70 guides freestream airflow 172 into the outlet 70 and provides a uniform flow through the bypass passage 58. More particularly, when the nozzle assembly 100 is deployed, the bypass passage outlet 70 has a radial width that extends between the elastic member 140 and the outer casing 18 of the core turbine engine 16. As shown in FIG. 2, the curvature of the bellmouth formed by the elastic member 140 gradually increases the radial width of the bypass passage outlet 70 as the elastic member 140 extends aft along the axial direction A. For instance, as shown in FIG. 2, a first radial width R1 of the outlet bypass passage 70 is less than a second radial width R2, which is a radial width of the outlet 70 measured aft of the first radial width R1. The gradual widening of the annular outlet 70 provides improved airflow guidance into the outlet 70, prevents airflow separation from the second end 62 of the nacelle 50, and allows for a uniform flow through the bypass passage 58, which prevents a decrease in engine performance and fan operability issues.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an outlet and an axial direction, a radial direction, and a circumferential direction, the gas turbine engine comprising:
    a core turbine engine;
    a nacelle disposed about the core turbine engine along the circumferential direction, the nacelle extending between a first end and a second end along the axial direction; and
    a nozzle assembly disposed at or proximate the second end of the nacelle and movable between a stowed position and a deployed position, the nozzle assembly comprising:
        an outer panel coupled with the nacelle, the outer panel movable along the radial direction to move the nozzle assembly between the stowed position and the deployed position; and
        an elastic member coupled with the outer panel and with the nacelle, wherein when the nozzle assembly is in the deployed position, the elastic member is inflated with an airflow such that the elastic member forms a bellmouth at the outlet of the gas turbine engine.

2. The gas turbine engine of claim 1, wherein the nacelle is spaced from the core turbine engine along the radial direction so as to define a bypass passage therebetween, and wherein the outlet is a bypass passage outlet.

3. The gas turbine engine of claim 1, further comprising: a thrust reverser system, wherein the thrust reverser system is a variable pitch fan assembly.

4. The gas turbine engine of claim 1, wherein the nacelle comprises an outer surface and wherein the nacelle defines a recess along the outer surface, and wherein when the nozzle assembly is in the stowed position, the elastic member is disposed within the recess and the outer panel is aligned with or seated flush with the outer surface of the nacelle along the radial direction.

5. The gas turbine engine of claim 1, wherein the elastic member is an airtight, elastic band.

6. The gas turbine engine of claim 1, wherein the elastic member extends annularly about the nacelle along the circumferential direction.

7. The gas turbine engine of claim 1, wherein the outer panel is pivotally coupled with the nacelle.

8. The gas turbine engine of claim 7, wherein the outer panel comprises one or more pivot connection members and the nacelle comprises one or more pivot connection members, and wherein the outer panel is pivotally coupled with the nacelle by one or more linkages.

9. The gas turbine engine of claim 7, wherein the outer panel is pivotally coupled with the nacelle by a lever arm, the lever arm extending between a proximal end and a distal end, and wherein the proximal end of the lever arm is pivotally connected with the nacelle and the distal end is attached to an inner surface of the outer panel.

10. The gas turbine engine of claim 1, wherein the nozzle assembly further comprises a retraction assembly for stowing the elastic member when the nozzle assembly is moved to the stowed position.

11. The gas turbine engine of claim 1, wherein the nacelle comprises an outer surface and wherein the nacelle defines a recess along the outer surface, the recess being defined by a recessed wall and one or more sidewalls, and wherein the nozzle assembly further comprises a retraction assembly, the retraction assembly comprising a retractable line tethered to the elastic member and retractable within the nacelle through an opening in at least one of the recessed wall and the one or more sidewalls.

12. The gas turbine engine of claim 1, wherein the outer panel is translatable along the radial direction between the deployed position and the stowed position.

13. A method for reversing a thrust of a turbofan engine defining a bypass passage, an axial direction, a radial direction, and a circumferential direction,
the turbofan engine comprising:
a core turbine engine;
a nozzle assembly movable between a stowed position and a deployed position; and
a nacelle disposed about the core turbine engine along the circumferential direction and spaced from the core turbine engine along the radial direction to define the bypass passage therebetween, the nacelle extending between a first end and a second end along the axial direction, the second end of the nacelle and the core turbine engine defining a bypass passage outlet when the nozzle assembly is in the stowed position, and wherein the nozzle assembly comprises:
an outer panel coupled with the nacelle, the outer panel movable along the radial direction to move the nozzle assembly between the stowed position and the deployed position; and
an elastic member coupled with the outer panel and with the nacelle, the method comprising:

reversing a direction of a bypass airflow through the bypass passage; and
deploying the nozzle assembly to the deployed position such that the elastic member of the nozzle assembly is inflated with an inflation airflow to form a bellmouth at the bypass passage outlet of the bypass passage.

14. The method of claim 13, wherein the turbofan engine comprises a variable pitch fan assembly comprised of a plurality of fan blades each rotatable through a plurality of fan blade angles about respective pitch axes, and wherein reversing the direction of the bypass airflow through the bypass passage comprises rotating the plurality of fan blades about their respective pitch axes.

15. The method of claim 13, wherein the inflation airflow is a free stream airflow; and
wherein deploying the nozzle assembly comprises moving the outer panel of the nozzle assembly radially outward from an outer surface of the nacelle, and wherein when the outer panel is moved radially outward from the outer surface of the nacelle, the elastic member is inflated with the free stream airflow to form the bellmouth.

16. The method of claim 13, wherein when the nozzle assembly is deployed, the bypass passage outlet has a radial width extending between the elastic member and an outer casing of the core turbine engine of the turbofan engine, wherein the curvature of the bellmouth gradually increases the radial width of the bypass passage outlet.

17. A turbofan engine defining an axial direction, a radial direction, and a circumferential direction, the turbofan engine comprising:
a core turbine engine;
a nozzle assembly movable between a stowed position and a deployed position; and
a nacelle disposed about the core turbine engine along the circumferential direction and spaced from the core turbine engine along the radial direction to define a bypass passage therebetween, the nacelle extending between a first end and a second end along the axial direction, the second end of the nacelle and the core turbine engine defining a bypass passage outlet when the nozzle assembly is in the stowed position, and wherein the nozzle assembly comprises:
an outer panel coupled with the nacelle, the outer panel movable along the radial direction to move the nozzle assembly between the stowed position and the deployed position; and
an elastic member coupled with the outer panel and with the nacelle, wherein when the nozzle assembly is in the deployed position, the elastic member is inflated with an airflow such that the elastic member forms a bellmouth that at least partially defines the bypass passage outlet.

18. The turbofan engine of claim 17, wherein the outer panel extends between a first end and a second end along the axial direction, the first end being positioned upstream of the second end, and wherein when the nozzle assembly is in the deployed position, the first end of the outer panel is positioned outward of the second end of the outer panel along the radial direction.

19. The turbofan engine of claim 17, wherein the outer panel comprises an outer surface and an opposing inner surface, and wherein the nacelle defines a recess along the outer surface of the nacelle, the recess being defined by a recessed wall and one or more sidewalls, and wherein the elastic member is attached to the recessed wall of the nacelle and the inner surface of the outer panel.

20. The turbofan engine of claim 17, wherein a distance is defined between the inner surface of the outer panel and the recessed wall of the nacelle when the nozzle assembly is in the deployed position, and wherein the length of the elastic member is at least two (2) times greater than the distance.

* * * * *